United States Patent [19]

Soran

[11] 4,166,486
[45] Sep. 4, 1979

[54] NOZZLE FOR AN APPARATUS FOR DENATURING FOOD PRODUCTS

[75] Inventor: Robert L. Soran, Modesto, Calif.

[73] Assignee: Beatrice Foods Co., Modesto, Calif.

[21] Appl. No.: 868,388

[22] Filed: Jan. 10, 1978

[51] Int. Cl.² .......................... B65B 1/04; B67C 3/02
[52] U.S. Cl. ........................................................ 141/105
[58] Field of Search ........................ 239/598; 425/461; 141/392, 9, 105

[56] References Cited

U.S. PATENT DOCUMENTS

| | | | |
|---|---|---|---|
| 1,859,467 | 9/1928 | Rath | 426/87 |
| 2,246,770 | 6/1941 | Wessel | 99/2 |
| 2,246,871 | 6/1941 | Balch | 107/54 |
| 2,284,651 | 6/1942 | Gundlach et al. | 107/54 |
| 2,293,538 | 8/1942 | Freidman | 107/1 |
| 2,334,052 | 11/1943 | Wedin | 107/54 |
| 2,774,314 | 12/1956 | Moser | 107/1 |
| 2,858,217 | 10/1958 | Benson | 99/80 |
| 3,080,123 | 3/1963 | Erns | 239/230 |
| 3,592,940 | 7/1971 | Quesada | 99/148 |
| 3,677,691 | 7/1972 | Koch et al. | 8/41 |
| 3,851,075 | 11/1974 | Wisdom | 426/250 |
| 3,876,743 | 4/1975 | Soderlund et al. | 264/75 |
| 3,901,641 | 8/1975 | Onder | 425/461 |
| 3,943,262 | 3/1976 | Winkler et al. | 426/250 |

Primary Examiner—Steven L. Stephan
Attorney, Agent, or Firm—Huebner & Worrel

[57] ABSTRACT

An improved nozzle for an apparatus for denaturing food products, the nozzle having an inlet end mounted on a source of flowable food product material which is propelled in a stream along the axis of the nozzle, a planar surface contacting the material and extending at right angles to a plane normal to the axis, and a duct extending along the axis for injection of a denaturing agent to form a streak of the agent extending longitudinally of the stream.

5 Claims, 6 Drawing Figures

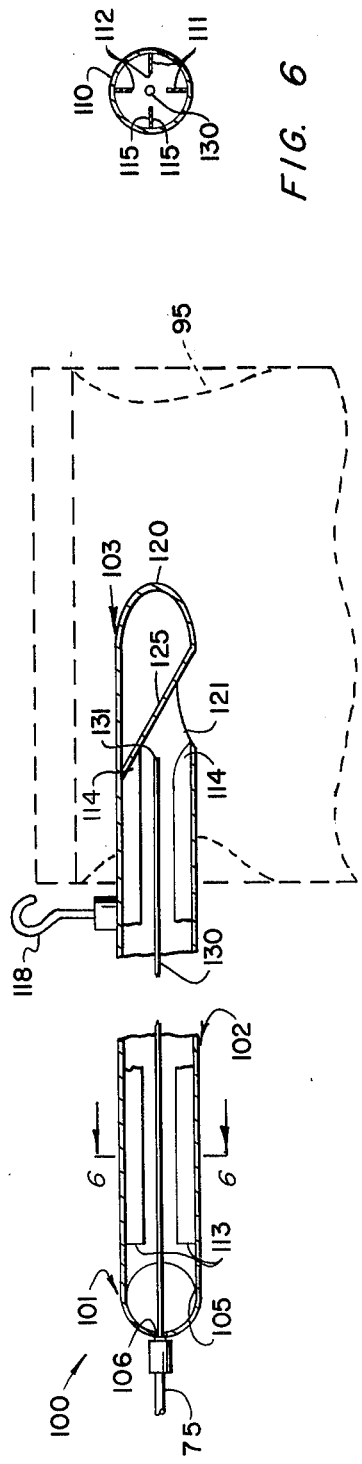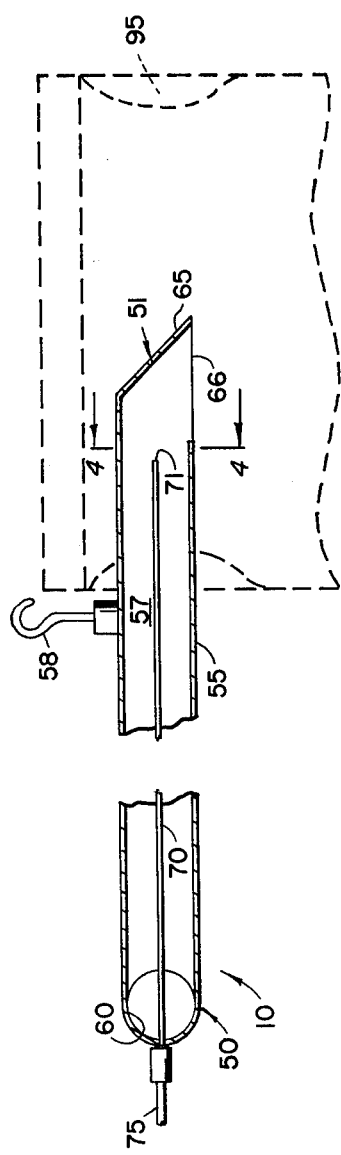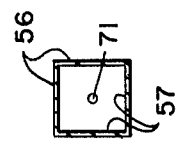

NOZZLE FOR AN APPARATUS FOR DENATURING FOOD PRODUCTS

BACKGROUND OF THE INVENTION

1. Field of the Invention

The present invention relates to an improved nozzle for an apparatus for denaturing food products, and more particularly to such a nozzle through which a food product not intended for human consumption is discharged for packaging and, during such discharge, is injected with a denaturing agent consisting of an edible dye which forms a streak of the dye along the product during such discharge. The streak of dye marks the product by color so that the product cannot subsequently be confused with food for humans.

In the killing; skinning; scalding; scaling; defeathering; processing; eviscerating; cleaning; packaging; storing; and marketing of animals, poultry, and fish, the flesh thereof frequently becomes damaged so as to be unfit for human consumption. Further, many preslaughtering injuries can render the flesh unfit for human consumption as can death caused by other than slaughter. Such unfit flesh nevertheless has other uses and, because of the extremely voluminous production rates in the meat, poultry and fish industries, the unfit flesh is present in very large quantities and of quite appreciable value when it can be properly diverted to other uses.

Since such unfit flesh frequently cannot be visually distinguished from flesh fit for human consumption, intricate regulations have been established requiring conspicuous marking of the unfit flesh so it can be channeled into animal food or other markets without danger of it being inadvertently consumed by humans. Such marking is known as "denaturing."

2. Description of the Prior Art

Many problems are encountered in endeavoring to denature ground or comminuted flesh. Such comminuted flesh is required not to contain more than four percent by weight of coarsely ground hard bone, in pieces no smaller than the opening size specified for No. 5 mesh in the standards issued by the United States Bureau of Standards, or six percent by weight of coarsely ground hard bone, in pieces no smaller than the opening specified for No. 8 mesh in said standard, and the denaturing agent must be intimately mixed with all of the material to be denatured and applied in such quantity and manner that it cannot easily be removed by washing or soaking and in sufficient amount to give the material a distinctive color, odor or taste. Because of the nature of comminuted flesh, at one time it was necessary to provide denaturing agent to color or otherwise distinctively to mark the entire mass. Although modern equipment for de-boning meat has a demonstrated ability speedily and economically to remove flesh from bones and such flesh has long been known to have a high potential market value, its marketing has been severely restricted or precluded by the requirement that the entire mass be distinctively marked if classified as requiring denaturing. The economic difficulties are aggravated by the fact that certain of the dyes which government regulations allow for marking the flesh by color are expensive, especially when used in the quantity required at the previously mentioned voluminous production rates.

It has been recognized that if the comminuted flesh could be striped or striated with dye the marking requirements could be met with enormous savings in the dye. Further, such marked comminuted flesh would be more conspicuous than uniformly dyed masses thereof. Recognizing these facts, the present applicant developed a method and apparatus that could apply streaks, strips, ribbons, or other striae of dye to comminuted meat in a manner that is economically feasible. The present applicant has applied for United States Letters Patent for this method and apparatus in an application filed Mar. 5, 1976, Ser. No. 664,149, and entitled "Method And Apparatus For Denaturing Food Products Not Intended For Human Consumption", now U.S. Pat. No. 4,114,526.

A problem generally encountered in the application of such dyed streaks or strips is the blending or diffusing of adjacent streaks so that the product is not as distinctively marked as desired. This problem is made worse by the fact that certain of the allowable dyes are water soluble and tend to "run" in a mass of comminuted flesh which contains significant amounts of moisture.

A convenient and economical method of generating a streak of dye is to inject the dye into a stream of comminuted meat product flowing through a conduit for deposition in a mass of the extruded material. The problems with blurring of the streaks are aggravated when the dye is applied exteriorly of the stream due to contact of the extruded stream with adjacent product in the deposited mass. Furthermore, linearity of the streaks is highly desirable to make the streaks stand out in the deposited mass of comminuted flesh. It has been found that such linearity is difficult to attain while extruding the flesh, since the stream tends to rotate as it is extruded in an undesirable mixing or stirring action. This problem is most difficult when a strip or streak is applied exteriorly of the stream where the rotational movement is likely to be greatest and when contact with adjacent flesh in the deposited mass is most likely.

SUMMARY OF THE INVENTION

Accordingly, it is an object of the present invention to provide an improved nozzle for an apparatus for denaturing food products.

Another object is to provide such a nozzle which minimizes blurring of dyed streaks generated by such a nozzle to distinguish such products not intended for human consumption.

Another object is to provide such a nozzle for use in extruding such a product in which the streaks are applied so as not to contact previously or subsequently extruded product in a mass thereof.

Another object is to provide such a nozzle which applies such streaks linearly in a stream of such product being extruded.

Another object is to provide such a nozzle particularly suited to the denaturing of moist comminuted meat product.

Further objects are to provide improved elements and arrangements thereof in an improved nozzle for denaturing food products such as meat, poultry, fish, or the like, which is economical, adapted for use with existing apparatus, and is effective in carrying out its intended purposes.

BRIEF DESCRIPTION OF THE DRAWINGS

FIG. 3 is an axial section at an enlarged scale of the nozzle of FIG. 1 with a central portion broken away for illustrative convenience. The nozzle is shown inserted into a sack fragmentarily represented by dash lines.

FIG. 4 is a transverse section of the nozzle taken on line 4—4 of FIG. 3.

FIG. 5 is an axial section of a second form of nozzle embodying the principles of the present invention.

FIG. 6 is a transverse section of the nozzle of FIG. 5 taken on line 6—6 of FIG. 5.

DESCRIPTION OF THE PREFERRED EMBODIMENT

First Form

Figure 1:
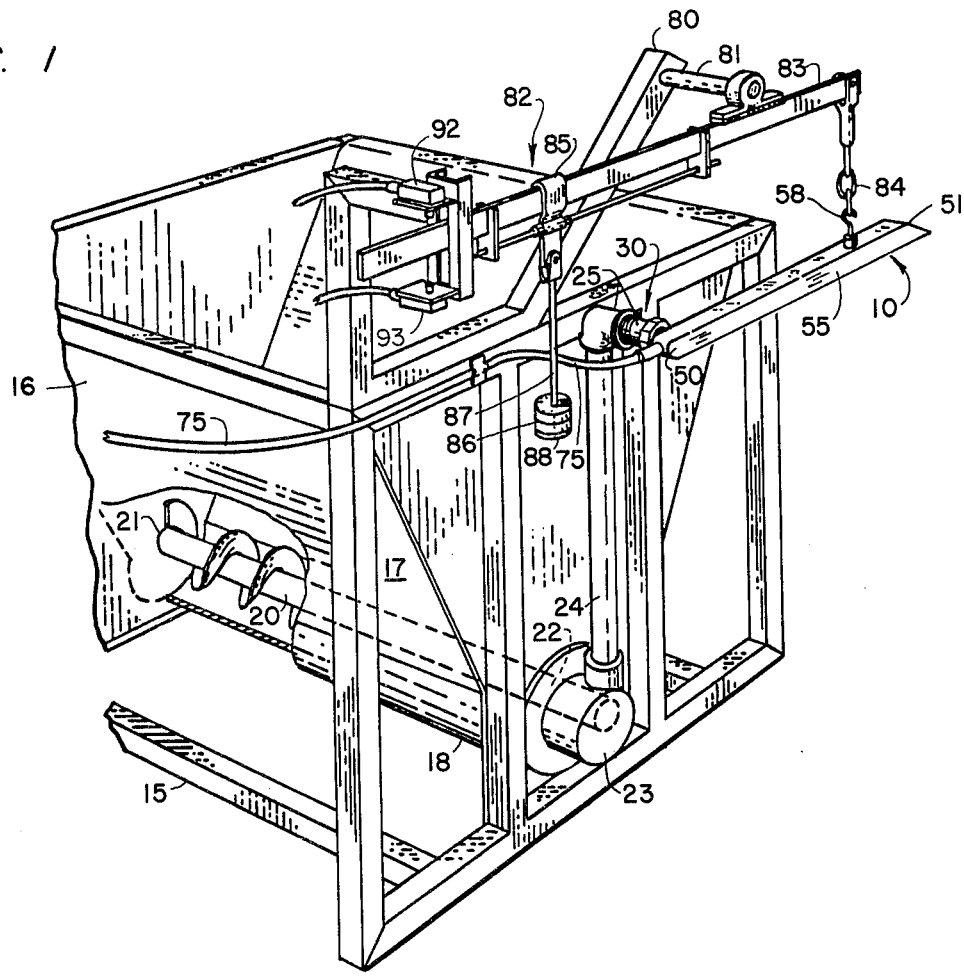
FIG. 1 is a fragmentary perspective view of an apparatus for denaturing food products not intended for human consumption which constitutes an operational environment for the nozzle of the present invention, a first form of which is shown installed in said apparatus.

Referring more particularly to the drawings, in FIG. 1 is shown a portion of an apparatus for denaturing food products. The apparatus includes a first form of improved nozzle or conduit, generally designated by the numeral 10 and subsequently to be described in greater detail, which embodies the principles of the present invention.

The improved nozzle 10 of the present invention is adapted for use on various types of apparatus for denaturing food products not intended for human consumption. However, the particular form of such apparatus shown and described herein is used for illustrative convenience and constitutes a suitable environment for the practice of the present invention. The nozzle was conceived and designed for use on the food product denaturing apparatus aforementioned for which application for patent has been filed in the United States Patent and Trademark Office, Ser. No. 664,149.

The apparatus has any suitable frame 15 supporting a hopper 16 adapted to receive flowable comminuted meat product or material. The hopper has downwardly convergent walls 17 which connect to a horizontal, semicylindrical conveyor housing 18. A screw conveyor 20 is rotatably mounted in the housing. The conveyor has a driven end 21 which is rotated by a power drive mechanism, not shown. The conveyor has an opposite delivery end 22 which has a driving connection to a pump 23. The pump has a discharge conduit 24 upwardly extended therefrom having a horizontal, cylindrical tubular portion 25 adjacent to the top of the frame 15. This horizontal portion is extended outwardly from the frame in substantially parallel relation to the conveyor.

Figure 2:
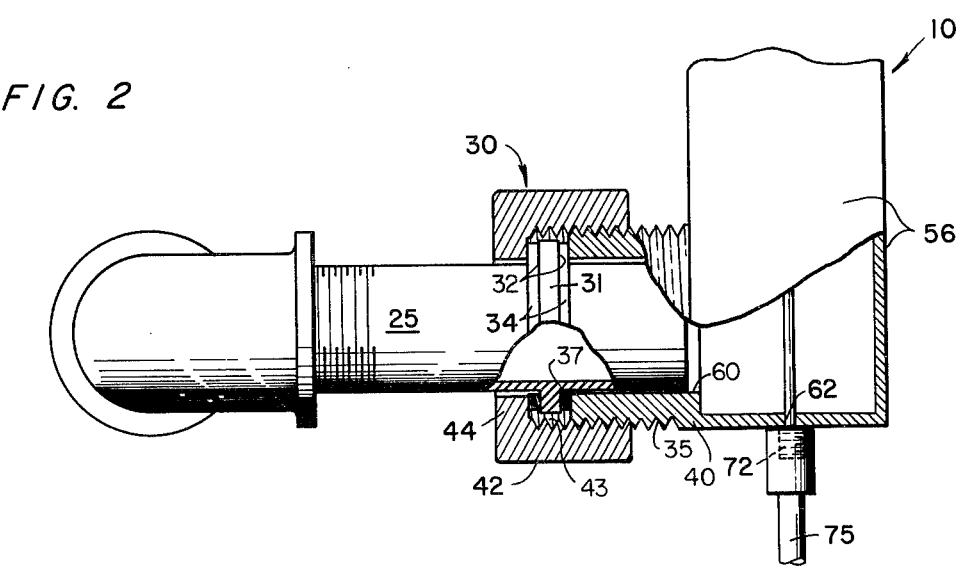
FIG. 2 is a fragmentary plan view at an enlarged scale of a pivotal mounting for the nozzle of FIG. 1.

The outward end of the horizontal tubular portion 25 of the discharge conduit is provided with a pivotal flow connection 30, best shown in FIG. 2. A flange 31 is formed on said portion and has a pair of axial, oppositely facing annular surfaces 32. A pair of annular washers 34 individually engage the annular surfaces. A cylindrically tubular, externally screw-threaded extension 35 is concentrically fitted externally to the tubular portion 25 of the conduit 24 outwardly of the flange. The axial end of the extension disposed toward the flange has an annular surface 37 engaged with the adjacent washer. The extension has an axial end 40 opposite the flange. An annular coupling 42 has an end portion provided with internal screwthreads 43 which engage the screwthreads of the extension. The end portion of the coupling opposite the internal screwthreads 43 has a centrally extending flange 44 which engages the washer 34 which is disposed toward the frame 15. The coupling can be tightened into the extension sufficiently to prevent leakage of material flowing through the coupling while allowing pivotal movement of the extension relative to the horizontal tubular portion 25 about the axis of the coupling.

The nozzle 10 has a closed inlet end portion 50 which is connected for fluid flow to the axial end 40 of the extension 35 of the pivotal flow connection 30. The nozzle is thus pivotally mounted on the horizontal portion 25 of the discharge conduit 24 for delivery of flowable material, such as comminuted meat, poultry or fish, not shown, into the nozzle. The nozzle extends, as shown in FIGS. 1 and 3, from its inlet end generally horizontally and in right-angular relation to the horizontal portion of the discharge conduit. The nozzle so extends linearly, defining a flow axis along the nozzle, to an outlet end portion 51 thereof opposite of the inlet end. The outlet end portion of the nozzle is disposed substantially outwardly of the frame 15.

The nozzle 10 has a central, prismatic, body 55 connecting the inlet and outlet end portions, 50 and 51 respectively, thereof. The body, preferably, is unitarily constructed with the opposite end portions. As shown in FIG. 4, the body has four planar sides 56 which form a prism parallel to the flow axis and so define the periphery of a volume through which a stream of flowable material can be propelled through the nozzle along the flow axis. The sides have individually, centrally disposed planar surfaces 57 which contact material flowing through the nozzle. While the surfaces 56 are parallel to the flow axis, the surfaces can also be described as extending perpendicularly to a plane normal to the flow axis. The body, preferably, is constructed of square tubular material and has one of the sides disposed perpendicularly to the axis of the pivotal flow connection 30. The body has a hook 58 fixed thereto on the upper side thereof toward the outlet end portion as shown in FIGS. 1 and 3.

The inlet end portion 50 of the nozzle 10, as shown in FIGS. 2 and 3, has an opening 60 in flow communication with the extension 35 at the axial end 40 thereof. The extension, preferably, is unitarily constructed with the nozzle and the opening has a diameter equal to the diameter of the interior of the extension. The inlet end portion is provided with a bore 62 therethrough substantially concentric with the flow axis of the nozzle.

The outlet end portion of the nozzle 10 is closed by an end plate 65 which is angularly related to the flow through the nozzle. The plate extends downwardly and axially outwardly of the nozzle from the upper side 56 thereof to the plane of the lower side thereof as best shown in FIG. 3. The lower side of the nozzle terminates inwardly of the end plate so as to define an outlet port 66 between the axial end of the lower side of the nozzle and the end plate.

The nozzle 10 includes a cylindrical duct 70 extending, as shown in FIGS. 2, 3, and 4, through the bore 65 in the inlet end portion 50 of the nozzle. The duct extends from the bore substantially centrally of the nozzle and concentrically with the flow axis to an open discharge end 71. The discharge end is concentrically related to the flow axis as shown in FIG. 4. Axially of the nozzle, the discharge end is spaced somewhat oppositely of the outlet port 66 from the end plate 65. The duct is fitted in flow-tight relation within the bore 68 in the inlet end of the nozzle, as shown in FIG. 4. A portion of the duct extends from the bore outwardly of the nozzle and oppositely from the outlet end thereof. This portion of the duct is provided with male screwthreads 72.

A dye conduit 75 has an end engaged with the screwthreads 72 on the duct 70. The conduit is in flow communication with the duct and extends therefrom exteriorly of the frame, as shown in FIG. 1, to a source, not shown of a flowable denaturing agent such as an edible dye.

An auxiliary frame 80 is mounted on the frame 15 and upwardly extended therefrom adjacent to the nozzle 10. A fulcrum shaft 81 is substantially horizontally extended from the auxiliary frame transversely above the nozzle 10. A scales 82 is mounted on the shaft. The scales includes a beam 83 pivotally mounted on the shaft and oppositely extended therefrom. One end of the beam is connected to the hook 58 of the nozzle 10 in supporting relation to the nozzle by a linkage 84. The scales includes a slide 85 which can be adjustably positioned longitudinally on the beam and which has selected numbers of weights 86 supported thereon by a depending rod 87 and plate 88. It will be noted that the beam 83 and the nozzle 10 are substantially parallel when in horizontal position. A first microswitch 92 is mounted on the auxiliary frame above the beam in a position to be engaged and actuated when the beam pivots in a clockwise direction, as viewed in FIG. 1. Somewhat similarly, a second microswitch 93 is mounted on the auxiliary frame beneath the beam in a position to be actuated when the beam tips in a counterclockwise direction, as so viewed, and is rested thereon.

The nozzle 10 is adapted to be inserted, as shown in FIG. 4, into a sack 95 of well-known form so that an upper closure of the sack rests on the nozzle and the sack is suspended therefrom. The weights 86 are selected so that when the sack is not completely full, the beam 83, as viewed in FIG. 1, rotates counterclockwise and, when the sack is filled, the weight of the sack and contents rotates the beam clockwise. The power drive mechanism for the screw conveyor 20 for flowable comminuted meat material and the source of denaturing agent therefor, together with a suitable control system, are discussed and fully disclosed in the aforementioned U.S. Patent Application, Ser. No. 664,149, filed Mar. 5, 1976. For the purpose of understanding the present invention, the following description of the environmental apparatus is deemed sufficient. When the sack is not full and the beam is actuating the lower, first microswitch 92, manual actuation of a pushbutton electric switch, not shown, results in powered rotation of the conveyor. The conveyor drives the pump 23 which propels the material through the conduit 24 and the nozzle 10 at a predetermined rate. At the same time the source of denaturing agent is activated which results in a flow of the denaturing agent at a predetermined rate through the conduit 75 and the duct 70. The agent is then injected from the discharge end 71 of the duct centrally into the nozzle. When the sack is filled, the upper, second microswitch is actuated stopping the supply of the material and of the denaturing agent so that the filled sack can be removed. Although the beam rotates counterclockwise when the filled sack is removed, the flow of the material and of the agent does not resume until the pushbutton switch is manually actuated.

Second Form

A second form of improved nozzle embodying the principles of the present invention is generally designated by the numeral 100 and is shown in FIGS. 4 and 5. The second form is adapted for use with an apparatus for denaturing food products substantially identical in structure and operation to that previously described and shown in FIG. 1. The second form of nozzle has a closed inlet end portion 101. An externally cylindrical, tubular body 102 extends from the inlet end portion to an opposite, closed outlet end portion 103. The axis of the body defines a flow axis for flowable material propelled through the nozzle.

The inlet end 101 of the nozzle 100 is adapted for connection to an extension, not shown, similar to the extension 35 of the pivotal flow connection 30. The inlet end is in communication with the extension through an opening 105, corresponding to the opening 60 of the first form of nozzle 10, to receive flowable comminuted meat material therefrom. The axis of the opening is in right-angular relation with the flow axis of the nozzle. A bore 106, corresponding to the bore 62 of the first form of nozzle, extends through the inlet end portion of the second form of nozzle concentrically with the axis of the body 102.

The body 102 of the second form of nozzle 100 has a cylindrical peripheral wall 110. A plurality of planar members or vanes 111 extend axially of the body and radially inwardly from the wall to individual edges 112 radially spaced from the axis. Axially, each vane extends from an end 113 adjacent to the opening 105 to an opposite end 114 at the outlet end portion 103 of the nozzle. Each vane has a pair of transversely opposite planar sides defining planar surfaces 115 which contact flowable material which is propelled along the flow axis. These surfaces are in planes intersecting said axis. As will readily be apparent these surfaces are perpendicular to a plane normal to said axis. The nozzle, preferably, is provided with a pair of opposite substantially vertically extending vanes and a pair of opposite substantially horizontally extending vanes. The body has a hook 118 fixed thereto similar in structure and purpose to the hook 58 of the first form of nozzle.

The outlet end portion 103 of the second form of nozzle 100 terminates in a central, rounded point 120. The outlet end portion has a downwardly open outlet port 121. Axially of the nozzle, the port is adjacent to the location at which the exterior of the outlet portion begins to converge to the point 120. A plate 125 closes the outlet portion interiorly of the nozzle. The plate is disposed at an angle to the flow axis and extends from the edge of the outlet port adjacent to the point 120 upwardly and oppositely of the point to the inner surface of the nozzle. At the outlet end portion, the edge 112 of the lower vane 111 curves downwardly convergently to the edge of the outlet port opposite the point 120.

The vanes 111, preferably, are unitarily constructed as by extrusion or welding, with the peripheral wall 110 of the body 102 of the nozzle 100 of the second form of the present invention. It is also preferable that the inlet end portion 101, body 102, outlet end portion 103, and plate 125 be unitarily constructed.

The second form of nozzle 100 has a cylindrically tubular duct 130 extending in flow-tight relation through the bore 106 and concentrically with the axis of the body 102 to an open discharge end 131 adjacent to the outlet port 121. The duct is connected externally of the inlet end 101 for flow communication with the conduit 75 for a flowable denaturing agent.

The nozzle 100 is adapted, similarly to the nozzle 10, for insertion of the outlet portion 103 into the sack 95 for receiving denatured flowable material. Such insertion of the nozzle is facilitated by the point 120.

OPERATION

The operation of the described embodiments of the present invention is believed to be clearly apparent and is briefly summarized at this point. The overall operation of the apparatus for denaturing food material not intended for human consumption is essentially the same with both forms of nozzles 10 and 100.

Initially, the hopper 16 is provided with flowable comminuted meat material and the source of flowable denaturing agent is provided with a supply of such agent. A sack 95 is slid over the nozzle 10 or 100 and rested in supporting relation thereon, as depicted in FIG. 3 or FIG. 5. The weight of the empty sack, as previously discussed, is insufficient to rotate the beam 84 clockwise as viewed in FIG. 1 so that the upper beam rests in the lower microswitch 93. At this point, pressing the above described pushbutton electric switch results in the power drive mechanism rotating the screw conveyor 20 which, in turn, drives the pump 23. As a result, a stream of the flowable material is propelled through the conduit 24 and the pivotal flow connection 30 into the nozzle 10 or 100 through the opening 60 or 105. The flowable material then flows in a stream along the flow axis of the nozzle until the material is directed at an angle to the axis by the end plate 65 of the first form of nozzle 51 or the angled plate 125 of the second form. Pressing the pushbutton switch also results in the denaturing agent being supplied from the source thereof in a properly proportioned quantity concurrently with the flow of material. As a result, shortly before diversion of the material by the plate 51 or 125, the flowable denaturing agent is injected centrally of the stream through the discharge end 71 or 131 of the duct 70 or 130. As a result, a streak or strip of the denaturing agent, extending axially of the stream is formed therein. The stream, together with the streak embedded therein, is discharged through the outlet port 66 or 121 into the sack.

As the stream of comminuted meat material is discharged into the sack 95, it coils back and forth upon itself to form a mass of the material thoroughly streaked with the denaturing agent. When the predetermined quantity of comminuted meat material and denaturing agent is discharged into the sack, the weights 86 are overbalanced causing the beam 53 to rotate clockwise and actuate the upper microswitch 92. This results in stopping the flow of meat material and denaturing agent. The filled sack is then removed so that the filling cycle can be repeated.

As the stream of flowable comminuted meat material is propelled in a stream along the axis of the nozzle 10 of the first form of the present invention, any tendency of the stream to rotate as viewed in a plane normal to said axis is resisted by contact of the material with the surfaces 57 of the sides 56 of the prismatic body 55. These surfaces perform the dual function of defining a conduit for the stream and, since the surfaces are perpendicular to said plane, of causing the stream to flow only along said axis. This ensures that the streak of denaturing agent does not "wander" transversely of the stream if not injected precisely centrally thereof. In any event, the discharge end 71 of the duct 70 is positioned centrally of the stream so that the streak of denaturing agent is not exposed at the periphery of the stream. As a result the streak does not contact other portions of the stream coiled in the sack 95 so that the streak cannot "run" onto such other portions or be rubbed off as the stream coils into the sack. Since the stream is prevented from rotation by the planar surfaces 57, the coils tend to lie linearly across the sack. This results in the streaks of denaturing agent being disposed in substantially parallel and, therefore, conspicuous parallel stripes in the mass of comminuted meat material. Since these stripes generated by the present invention are relatively conspicuous, a relatively small amount of expensive dye is required to "denature" the material to indicate that it is not intended for human consumption.

The nozzle 100 of the second form of the present invention produces a result similar to the nozzle 10 of the first form. The duct 130 for the denaturing agent injects the agent centrally of the stream of comminuted meat material similarly to the manner in which the agent is injected in the first form. However, in the second form rotation of the stream of such material is prevented by contact with the planar surfaces 115 of the vanes 111. These surfaces, being planar surfaces perpendicular to the plane in which undesired rotation of the stream occurs, function similarly to the surfaces 57 of the first form of the present invention to prevent such rotation and objectionable mixing.

Although the invention has been herein shown and described in what are conceived to be the most practical and preferred embodiments, it is recognized that departures may be made therefrom within the scope of the invention, which is not to be limited to the illustrative details disclosed.

Having described my invention, what I claim as new and desire to secure by Letters Patent is:

1. In an apparatus for denaturing a flowable comminuted meat material by injecting an agent into a stream of the material so as to form a streak of the agent longitudinally of the stream, the improvement comprising:
    A. A nozzle through which the stream of material flows along a flow axis prior to being discharged from the nozzle, the nozzle having a tubular body extending about the flow axis and having internal surfaces substantially parallel to said flow axis and extending from an inlet end portion to an opposite outlet end portion;
    B. a plurality of vanes borne by and spaced substantially equidistant about said internal surfaces in radial relation to and spaced from the flow axis and extending more than half way between the inlet and outlet end portions; and
    C. a tubular duct substantially concentric to the flow axis extending to an open discharge end through which the agent is injected and which is inwardly adjacent to the outlet end portion of the nozzle.

2. An improved nozzle for an apparatus for denaturing flowable comminuted meat using an edible dye, comprising:
    A. a conduit elongated along a substantially straight longitudinal axis and having substantially planar side walls disposed in fixed angular relation relative to each other extending substantially parallel to the longitudinal axis from an inlet adapted for connection to a source of the flowable comminuted meat to an outlet facing laterally of said axis; and B. a tubular duct mounted on and within the conduit inwardly spaced from the side walls of the conduit and extending from a position adjacent to said inlet of the conduit and externally thereof adapted for connection to a source of said edible dye to a discharge end in proximity to the outlet of the conduit.

3. The nozzle of claim 2 wherein the discharge end of the duct is substantially concentric to the longitudinal axis of the conduit.

4. The nozzle of claim 2 wherein the conduit has an end plate disposed obliquely to the longitudinal axis of the conduit and interconnecting the side walls of the conduit extending from a position adjacent to the discharge end of the duct to a position bounding the outlet of the conduit spaced farther from said discharge end of the duct.

5. The nozzle of claim 2 wherein the conduit has four of said side walls spaced substantially equidistant from said longitudinal axis and each being of a substantially flat configuration.

* * * * *